May 22, 1945.   L. R. BOGARDUS   2,376,324
ELECTRIC DISTRIBUTION SYSTEM
Original Filed July 18, 1939
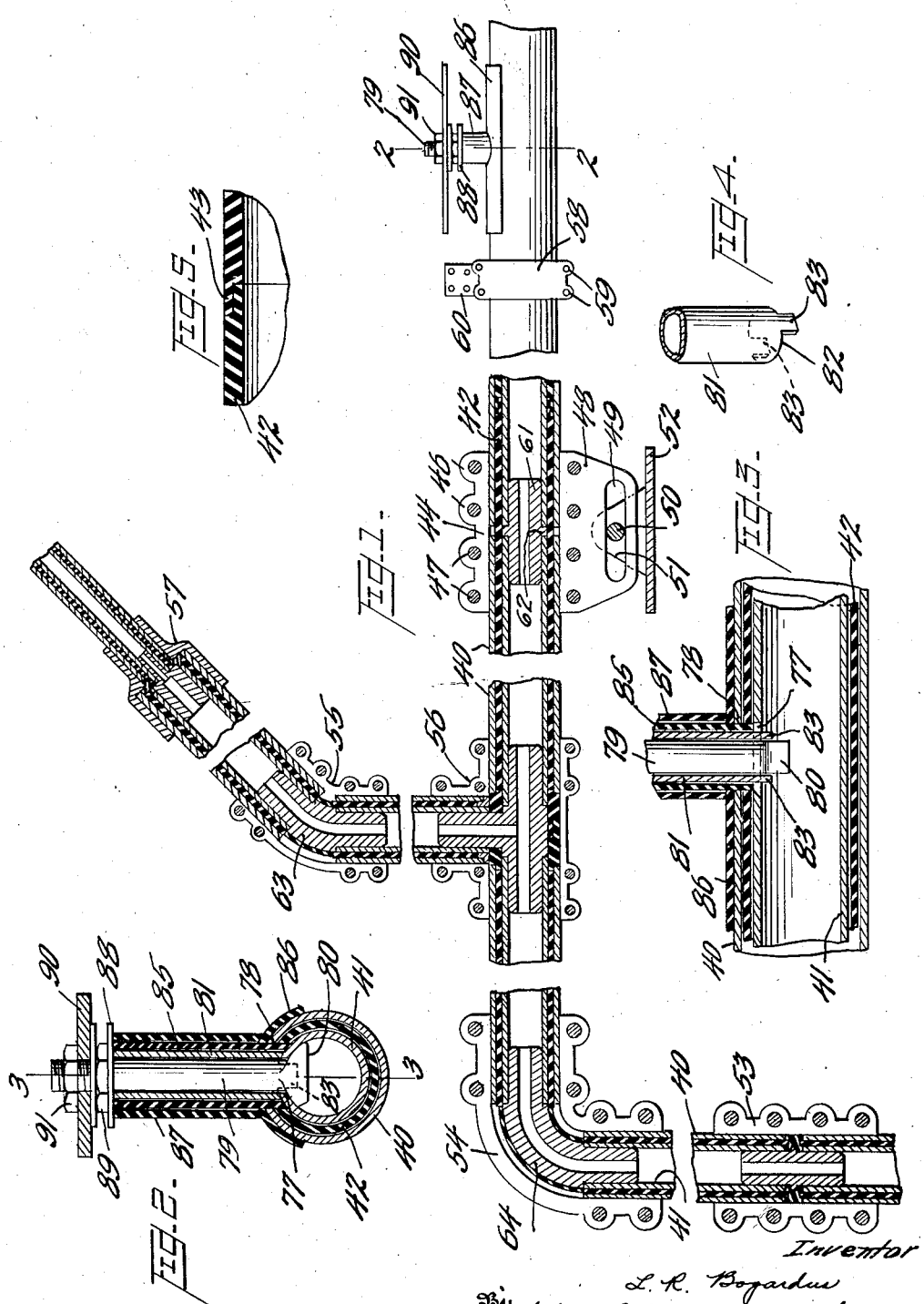

Patented May 22, 1945

2,376,324

UNITED STATES PATENT OFFICE 2,376,324

ELECTRIC DISTRIBUTION SYSTEM

Leonard R. Bogardus, Detroit, Mich., assignor to Packard Motor Car Company, Detroit, Mich., a corporation of Michigan Original application July 18, 1939, Serial No. 285,204. Divided and this application April 18, 1942, Serial No. 439,593

9 Claims. (Cl. 174—71)

This invention relates to distribution systems for electricity and more particularly to improved bus systems for high current, single-phase, inductive loads such as resistance welding equipment, induction furnaces, and the like.

It is the general object of the present invention to provide an electrical distribution system capable of delivering greater loads for longer distances with less voltage drop than with systems heretofore used for similar purposes and having a comparable amount of metal, the new system including connected sections of coaxially arranged inner and outer tubular conductors insulated from each other.

An important feature of the novel bus system comprises simple and effective means for taking taps from the inner tubular conductor whereby welding equipment may be spaced at any desired intervals along the bus and readily adjusted in position at any time in accordance with the requirements of the work being done.

Another important feature of the invention comprises a tap construction for association with an inner tubular conductor and including a bolt and sleeve construction adapted to be inserted through openings in the walls of the outer and insulating tubes and clamp onto the wall of the inner tube.

Other and further objects and features of the invention, and particularly details of construction, will be more apparent to those skilled in the art upon a consideration of the accompanying drawing and following specification wherein is disclosed a single exemplary embodiment of the invention with the understanding that such combinations of parts shown, variations thereof and modifications of the elements may be made as fall within the scope of the appended claims without departing from the spirit of the invention. Further advantages of the whole system and a more complete description thereof appear in my copending application Serial No. 285,204 for Electric distribution systems, filed in the United States Patent Office July 18, 1939, of which application this is a division. This application has matured to Patent No. 2,295,825, granted September 15, 1942.

In said drawing:

Figure 1 is a longitudinal central section through, and a partial elevation of a bus system constructed according to the present invention showing various types of fittings for connecting the conductor tubes;

Figure 2 is a transverse section on line 2—2 of Figure 1 showing a tap construction;

Figure 3 is a section on line 3—3 of Figure 2;

Figure 4 is a perspective view of a tap part; and

Figure 5 is a fragmentary sectional view on an enlarged scale of an approved form of joint between the sections of insulating tube.

The problem of adequately supplying the very large loads to electric resistance welders, induction furnaces, and other very heavy single-phase, low power-factored loads has not hitherto met with an entirely satisfactory solution because the feeders or busses supplying the current must be able to meet unusual requirements. For the sake of simplicity the problems of resistance welding loads will be considered herein as an adequate example of various types of load to which the present invention is applicable. Such welding loads, particularly in production plants, such as those fabricating automobile bodies, are very different from the ordinary light and power loads. Their characteristics of low power-factor, short time and very high currents, the requirement for using single-phase, and the desire for excellent regulation necessitate a different arrangement of conductors than has heretofore been used. The use of conventional motor wiring methods has been found entirely unsuited.

The earliest practice made use of a pair of heavy feeder cables in a conduit, but this soon exhibited marked disadvantages both in electrical characteristics and in the difficulty of making taps when welder positions were to be changed or new ones added. In certain production work the welding equipment is distributed every few feet along the buslines and must be changed in position from time to time as changes in production require. The conductors from the busses to the welding transformers and from these transformers to the guns must be kept at a minimum length so that new taps are imperative when equipment is to be moved even a very few feet.

Following this arrangement it became quite universal to use four or more feeder cables just taped together so that tapping for welder supply was not so much of a problem but still relatively difficult. The use of a plurality of cables resulted in a better interlinkage of magnetic fields and thus reduced the inductive reactance to some extent, but still the combined resistance and reactance drops were such that all welders had to be kept within one or two hundred feet of the main supply transformer and only a limited number could be distributed along the feeder system.

Following the wide use of the taped cables came the use of interlaced bus bars. This system makes use of rectangular strips or bars of copper of large cross-section separated by suitable insulation strips. Usually four, eight or more bars were used with adjacent bars on opposite circuit legs to improve the inductive reactance. The tapping difficulty was not materially reduced by this construction and such bus bar equipment became exceedingly heavy and cumbersome because portions of the bars were exposed and required a conduit or duct system or some form of housing which protected them from chance short circuits and at the same time permitted access for tapping.

In accordance with the present invention an extremely simplified distribution system has been worked out in which but two conductors are used, each large diameter copper tubes, coaxially disposed, closely adjacent to each other, and separated by a thin-walled, preformed, rigid, insulating tube. With this construction the reactance was immediately reduced to a point where it is slightly less than the ohmic resistance and contrary to expectations it was found that although using considerably less copper than the comparable interlaced bus system, more welders could be used and the distance to which current is conducted to them could be substantially doubled while at the same time maintaining better regulation than had been experienced with the interlaced bus system.

The practical embodiments of the present invention may take many forms and for the purpose of illustrating the invention there is shown in Figures 1 to 4 inclusive a combination of parts which has been found extremely satisfactory for supplying current to a production welding job where welders of various sizes, types, and uses are very closely arranged throughout the full length of a 600 foot coaxial bus.

The bus itself comprises a seamless, drawn copper outer tube 40 of standard 4 inch iron-pipe size, and an inner tubular member 41 of 3 inch extra heavy iron-pipe size. This provides a close approximation of the cross-sectional area of the outer tube, the respective areas in circular mils being 4,040,000 and 3,835,000. The diameter to wall thickness ratio of each of these tubes is greater than 10 and the spacing of the two is as close as possible to keep the inductance low. The provided spacing between the outer surface of the inner tube and the inner surface of the outer tube is less than that essential for air insulation at the 480 volts used. To mechanically and electrically separate the tubes and support the inner from the outer, a close fitting insulation tube 42 is provided, preferably of some molded and reinforced plastic such as the material sold under the trade name "Micarta." The sections of conducting and insulating tubing can be readily put together by sliding or telescoping one within the other, the fits being such as to permit this, which contributes materially to the ease of field assembly.

The outer tube is grounded at frequent intervals and its outer surface is bare. It can be supported in any convenient manner and since it is at ground potential no costly insulators are required. Any conventional form of pipe clamp may be used. The copper tubing because of its size, is quite heavy and it is found convenient to use it in lengths of 12-15 feet. The joints may be staggered between the inner and outer metal tubes or they can be made at the same place with no difficulty as shown. Joints in the insulation tube are preferably simple overlaps formed by counterboring the end of one and reducing the outside diameter of the other until they can be telescoped with sufficient friction to retain them in position as shown at 43 in Figure 5.

In Figure 1 at 44 is shown a clamp performing the dual function of mechanically and electrically securing together the substantially abutting ends of two sections of the outer tube and of providing a support for the same from any structural element available. The clamp comprises two substantially semi-circular parts provided with the upper flanges 46 perforated to receive clamp bolts 47 and the lower perforated flanges 48 likewise provided with bolts and extending downwardly and slotted at 49 to be slidably supported on a pin 50 spanning the ears 51 on the base 52 arranged to be mounted on any suitable support. At 53 is shown a similar clamp without the mounting portion, its sole purpose being to attach the two pipe sections together. A clamp similarly designed but providing an elbow of 90° is shown at 54 from which its construction will be obvious. Likewise a 45° L-clamp is shown at 55 and a T-clamp at 56. For reducing the diameter of the bus for extensions carrying lighter loads resort may be had to a suitable press or sweat-fitted reducer coupling 57.

Electrical connections to the outer pipe or tube are made by means of a simple strap clamp 58 made of suitably heavy copper to carry the required current. Clamping bolts are passed through the ears 59 thereon and a lug 60 is provided with four openings to receive bolts for attaching terminal lugs on welder cables. Obviously the connector straps may be applied anywhere that it is convenient on any unoccupied space on the surface of the bus. It will be noticed that all outside fittings engage the outer surface only of the bus sections and have no portions extending within the cylinder defined by the outer surface of the outer tube.

The inner tube 41 has its sections joined together by appropriate fittings whose outer surfaces engage the inner surfaces of the tube sections and no part of which extends beyond the outer surface of the inner tubes, except in a few special cases. For a simple butt joint there is shown at 61 a longitudinally perforated nipple having the circumferential flange 62 of an overall diameter the same as the outside diameter of the inner tube. The tube ends are fitted over the nipple and abut the flange. It has been found that current conductivity is best if a shrink-fit combined with solder sweating is used at these inner joints. It is obvious that 45° and 90° elbows such as shown at 63 and 64 may be readily provided, the flange being extended to fill out the space between the ends of the straight tube sections. At such elbows it is convenient to taper off the ends of the insulation tubes and to join them and cover the enlarged portion of the inner fitting with suitable cambric tape insulated with a proper impregnant as is customary. This can be done before applying the outer tube sections and their clamp parts.

One of the important features of the present invention is the ease with which taps can be taken from the tubular conductors. The outer tap has already been described and reference should be had to the drawing for the manner of effecting a tap to the inner tube. Each inner tube is provided, wherever a tap may be required, with a rectangular slot 77 as seen in Figures 2 and 3, the long axis extending longitudinally of the tube. The insulation tube and the outer tube are drilled with circular apertures 78 having a diameter substantially equivalent to the maximum length of the rectangular slot in the inner metal tube.

The actual connecting member is a T-headed copper bolt having a cylindrical shank 79 and the head 80 curved on its undersurface to the same radius as the inner wall of the inner tube. This head may be passed through the openings in the outer and insulation tubes, and, by proper orientation, through the slot in the inner tube which is sloped and sized like the head. It may then be rotated 90° about the axis of the shank to the position shown in Figures 2 and 3 whereby the curved undersurface of the head beyond the shank will closely fit and contact with the inner wall of the inner tube. Next a copper sleeve 81, best shown in Figure 4, is slid over the shank of the bolt. This sleeve has its lower edge 82 curved to fit the outer surface of the inner tube 41 as shown in Figure 4. Extending from this edge are the two lugs 83 each having a transverse width the same as that of the narrow dimension of the slot 77 and a length at least that of the wall thickness of tube 41. These projections extend down beside the head 80 as seen in Figure 5, and fit into the slot, closely engaging the walls thereof to prevent rotation of the sleeve in the tube and also to prevent rotation of the T-headed bolt.

With the bolt and sleeve in position they are covered by an insulation tube 85, the lower end of which is curved to fit the outer surface of the inner conducting tube. The outside diameter of this insulation is such as to closely fit through the openings in the main insulation tube and the outer conducting tube. Over this tube 85 is closely fitted the opening of a shield 86 whose inner surface is curved to fit the outer surface of the outer tube. To retain this shield in position a second insulation sleeve 87 closely fits over the tube 85 and has its lower end arranged to bear on the shield and hold it in position. The upper ends of the copper sleeve 81 and the insulation tubes 85 and 87 are cut off at right angles and in alignment, and bearing on their outer ends is the metal washer 88 held in position by the lock nut 89 which presses downwardly on the copper sleeve 81 and draws upwardly on the shank of the bolt to which it is threaded and tightly clamps the inner conductor tube between the lower end of the sleeve and the upper face of the bolt head, providing excellent electrical contact.

Current is taken off from the bolt by attaching thereto a bus plate 90 by means of a second nut 91. This plate may be conveniently perforated with two holes on each side of the bolt to receive small bolts for clamping the terminal lugs of welding cables thereto.

Preferably the inner terminals or taps, just described, are spaced close to the outer tube terminal straps as shown at the right in Figure 1 and where a number of welding devices are used in production work which requires frequent changes in their positions, it is convenient to apply terminals at say six foot intervals. It may sometimes be desirable to provide for future needs by providing the apertures for inner terminals and covering these with suitable insulation so that the positions are available for inserting the terminals when required.

Having thus described the invention, what is claimed as new and desired to be secured by Letters Patent is:

1. A bus system comprising a section of co-axially arranged inner and outer tubular conductors insulated from each other and a line tap for the inner conductor including a T-headed bolt, a metal sleeve slidably fitting the shank thereof, the inner tube having a longitudinally disposed opening to just pass said bolt head, the outer tube having a circular opening just larger than the major axis of said head, the head being positioned transversely of and within the inner tube with the sleeve surrounding the bolt shank and bearing on the outer surface of the inner tube, an insulating sleeve surrounding the metal sleeve and having its inner end bearing on the inner tube, and a washer and lock nut on the bolt to clamp the inner tube between said head and metal sleeve.

2. The bus system as defined in claim 1 in which the undersurface of the head and the lower end of the metal sleeve are curved to closely fit the inner and outer surfaces respectively of the inner tube.

3. The bus system as defined in claim 1 in which the metal sleeve has its lower end provided with spaced lugs fitting beside said head and closely within said opening to prevent rotation of the said bolt.

4. The bus system as defined in claim 1 in which the undersurface of the head and the lower end of the metal sleeve are curved to closely fit the inner and outer surfaces respectively of the inner tube, said sleeve having extensions thereon lying alongside of said bolt head and fitting in said inner tube opening to prevent rotation of said bolt after initial positioning.

5. A bus system for delivering power to a welder, comprising a section of coaxially arranged inner and outer one piece, substantially closed tubular conductors insulated from each other, and a line tap positively clamped to the inner and outer surfaces of a wall of the inner of said tubular conductors for connection to the welder, said tap passing through an aperture provided in the wall of the outer conductor for the purpose and insulated therefrom, said tap being spaced from and independent of the ends of the section.

6. A bus system comprising coaxially arranged one piece inner and outer substantially closed tubular conductors insulated from each other by a tube of insulation, the inner conductor having an opening through the wall of less area than aligned openings in the outer conductor and insulation tube, a tap comprising relatively movable clamp elements both adapted to pass through the larger openings and one through the smaller opening, and means to urge said clamp elements toward each other to engage the wall of the inner tube for mechanical and electrical connection thereto.

7. A bus system comprising coaxially arranged one piece inner and outer substantially closed tubular conductors insulated from each other by a tube of insulation, the inner conductor having an opening through the wall of less area than aligned openings in the outer conductor and insulation tube, a tap comprising relatively movable clamp elements both adapted to pass through the larger openings and one through the smaller opening, means to urge said clamp elements toward each other to engage the wall of the inner tube for mechanical and electrical connection thereto, and means to insulate said clamp elements from the outer conductor.

8. A bus system comprising coaxially arranged one piece inner and outer substantially closed tubular conductors insulated from each other by a tube of insulation, the inner conductor having an opening through the wall of less area than aligned openings in the outer conductor and insulation tube, a tap comprising relatively slidable telescoped clamp elements having heads both adapted to pass through the larger openings and one through the smaller opening, and means on one of said clamp elements and engaging the other to urge the heads toward each other to engage the inner tube for mechanical and electrical connection thereto.

9. A bus system for delivering power to a welder, comprising a section of coaxially arranged inner and outer substantially closed tubular conductors spaced from each other, continuous tubular insulating means in the space between the conductors, and a line tap clamped to the inner and outer surfaces of a wall of a continuous portion of the inner of said tubular conductors for connection to the welder, said tap passing through said tubular insulating means and through an aperture in the wall of the outer conductor and insulated from the latter, said tap being spaced from and independent of the ends of the section.

LEONARD R. BOGARDUS.